United States Patent [19]
Mullaney et al.

[11] Patent Number: 5,323,480
[45] Date of Patent: Jun. 21, 1994

[54] FIBER OPTIC SPLICE CLOSURE

[75] Inventors: Julian S. Mullaney; William N. Beauchamp; Thomas H. Wermke; Craig D. Ray, all of Raleigh, N.C.; Marc F. Moisson, Leuven, Belgium; Yogendra Dhanik, Fremont, Calif.

[73] Assignee: Raychem Corporation, Menlo Park, Calif.

[21] Appl. No.: 981,590

[22] Filed: Nov. 25, 1992

[51] Int. Cl.$^5$ .............................................. G02B 6/36
[52] U.S. Cl. ..................................... 385/135; 385/134
[58] Field of Search ............... 385/109, 111, 134, 135, 385/136, 137

[56] References Cited

U.S. PATENT DOCUMENTS

| | | | |
|---|---|---|---|
| 3,417,865 | 12/1968 | Suverkropp et al. | 206/329 |
| 4,489,830 | 12/1984 | Charlebois et al. | 385/135 |
| 4,573,575 | 3/1986 | Bergrath et al. | 206/380 |
| 4,627,686 | 12/1986 | Szentesi | 385/135 |
| 4,676,591 | 6/1987 | Driskel | 385/114 |
| 4,679,896 | 7/1987 | Krafcik et al. | 385/135 |
| 4,679,897 | 7/1987 | Driskel | 385/114 |
| 4,687,289 | 8/1987 | DeSanti | 385/135 |
| 4,690,499 | 9/1987 | Taylor et al. | 385/111 |
| 4,691,825 | 9/1987 | Schmetz et al. | 206/380 |
| 4,702,551 | 10/1987 | Coulombe | 385/135 |
| 4,753,509 | 6/1988 | Parstorfer | 385/99 X |
| 4,793,681 | 12/1988 | Barlow et al. | 385/135 |
| 4,840,449 | 6/1989 | Ghandeharizadeh | 385/135 |
| 4,846,566 | 7/1989 | Barnett et al. | 385/109 |
| 4,854,661 | 8/1989 | Cooper et al. | 385/99 |
| 4,913,522 | 4/1990 | Nolf et al. | 385/135 X |
| 4,927,020 | 5/1990 | Randy | 206/378 |
| 5,039,195 | 8/1991 | Jenkins et al. | 385/101 |
| 5,097,529 | 3/1992 | Cobb et al. | 385/135 |
| 5,100,221 | 3/1992 | Carney et al. | 385/135 |
| 5,185,845 | 2/1993 | Jones | 385/135 |

OTHER PUBLICATIONS

Raychem System Practice, FOSC 100D Fiber Optic Splice Closure System, Section RYCH-FO-100D, Issue 2, Mar. 1990.

Raychem Telecom, DWBS, Installation Procedure, Jun. 1987.

Primary Examiner—John D. Lee
Attorney, Agent, or Firm—Herbert C. Burkard; William D. Zahrt, II; A. Stephen Zavell

[57] ABSTRACT

A fiber optic splice closure includes a series of stacked splice trays pivotally secured within a housing, and oval shaped generally flexible transport tubes carrying the exposed optical fibers to the splice trays within the closure. The transport tubes have a differential flexibility to permit bending i a direction generally normal to the major dimension of the tube while preventing bending in a direction generally normal to the minor dimension of the tube. Accordingly, optical fiber ribbons carried by the transport tubes are protected from bending in a direction normal to their minor dimension. The splice trays are pivotally secured at one end to a bracket secured to an end cap of the housing. A hinge for each splice tray includes detents to hold an individual tray in a raised position to thereby facilitate access to an underlying tray. In addition, splice holders are provided on each splice tray and include a series of generally flexible walls extending outwardly from a base. The flexible walls further include hollow cavities to more readily accommodate splices of different sizes. A generally rigid shell with a predetermined pattern of openings therein is positioned to overlie the base carrying the flexible walls.

53 Claims, 6 Drawing Sheets

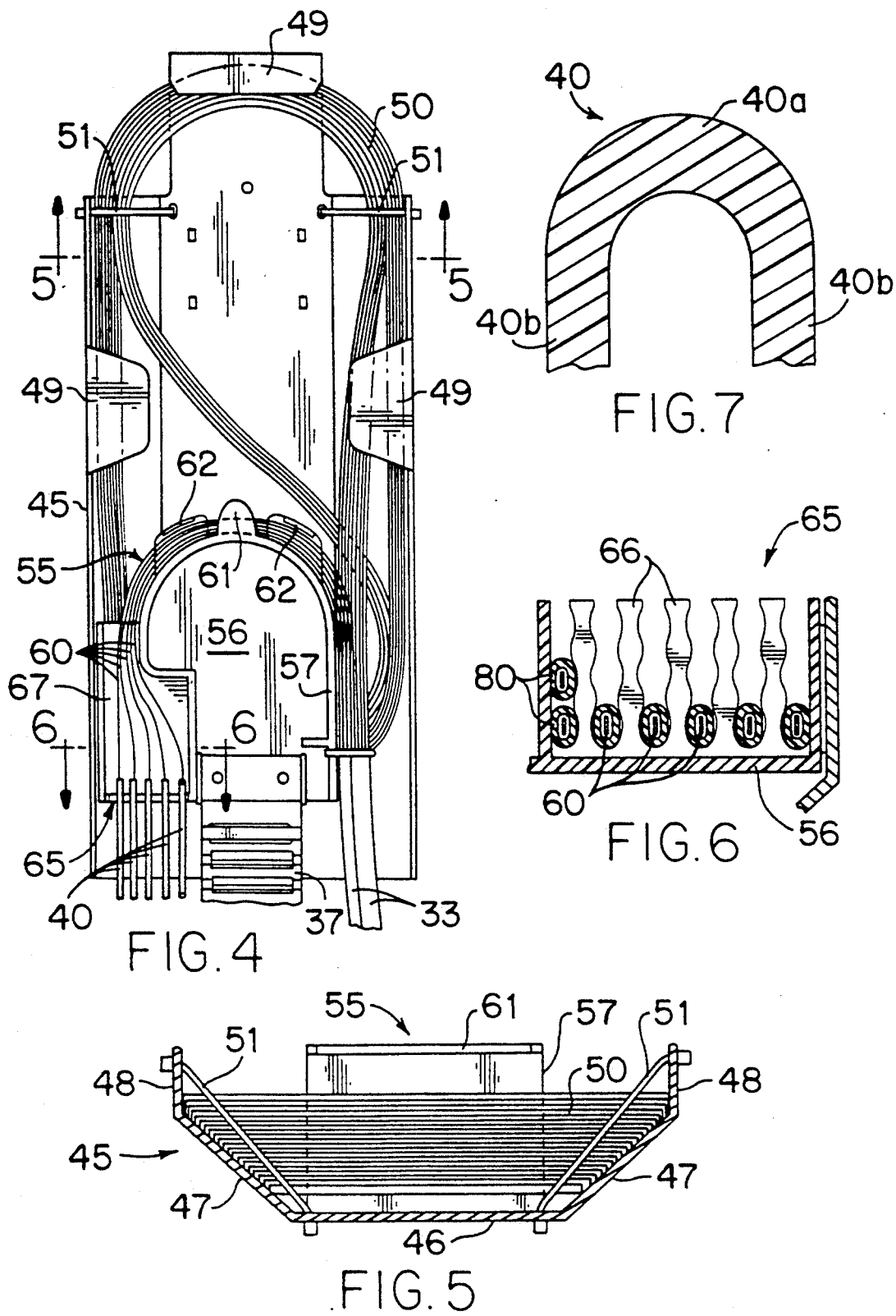

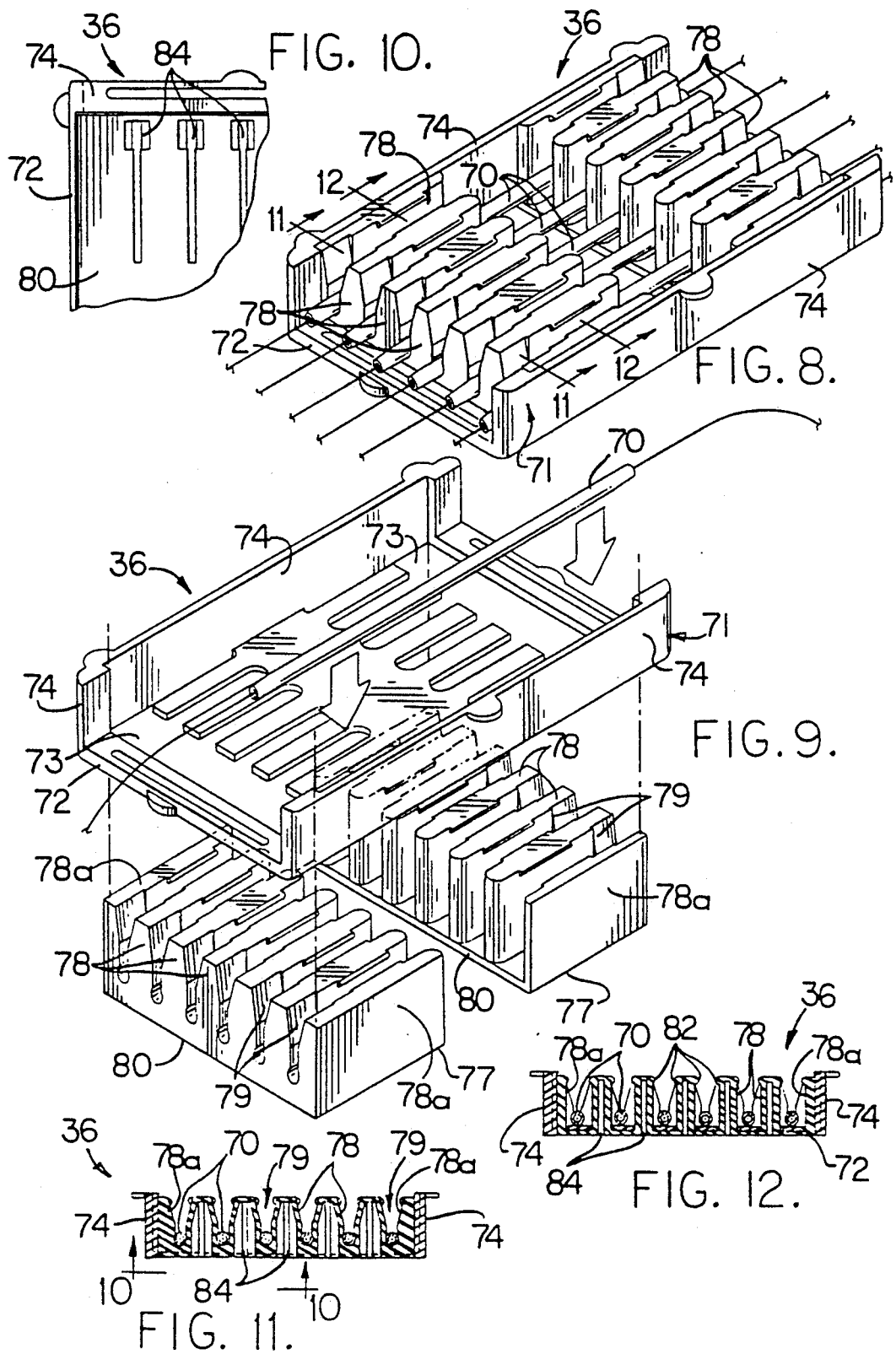

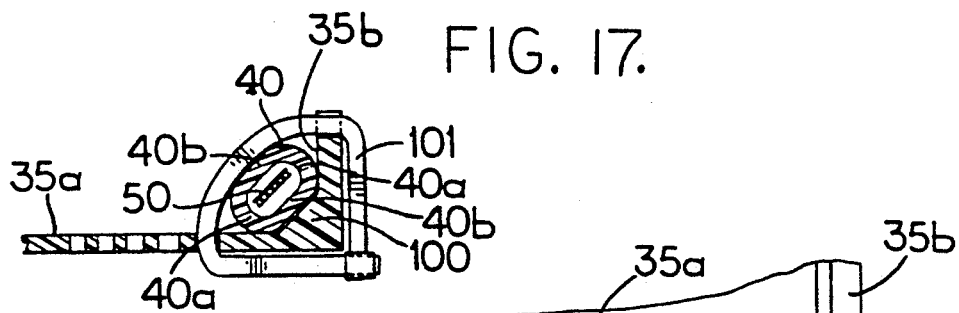
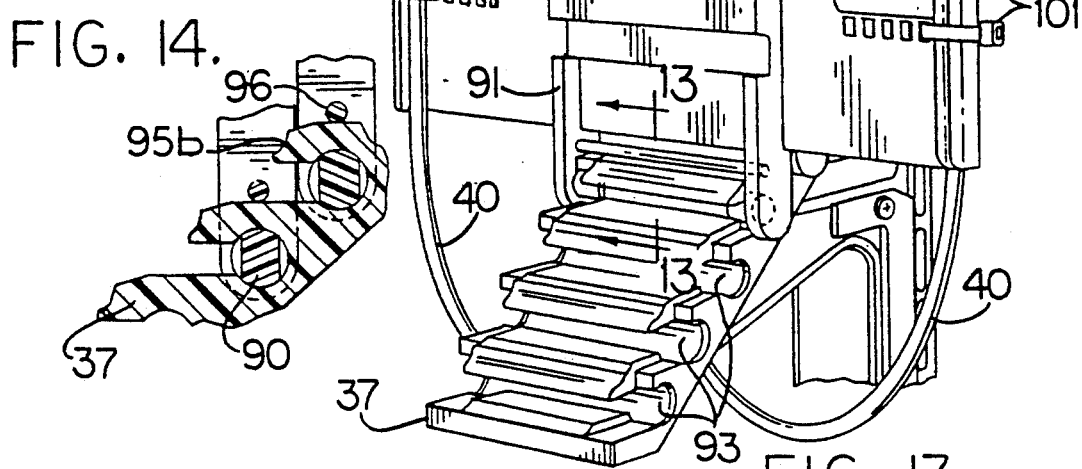
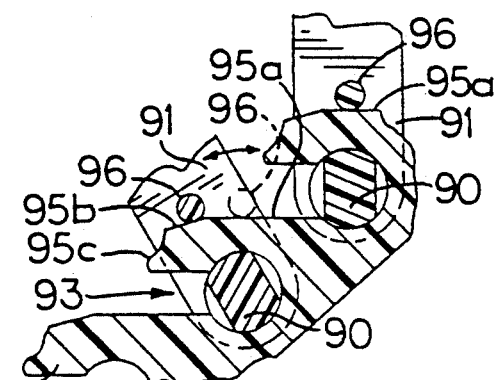
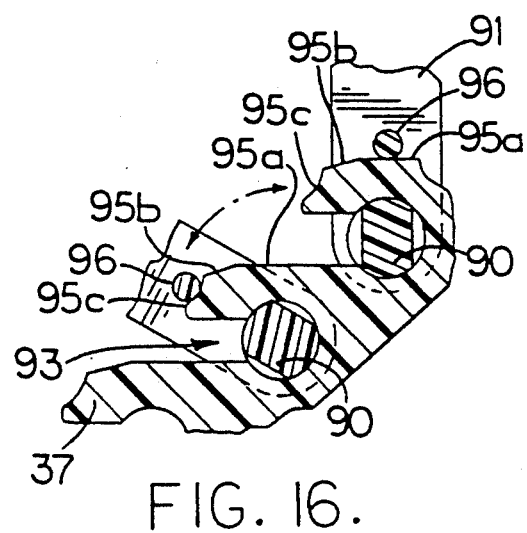

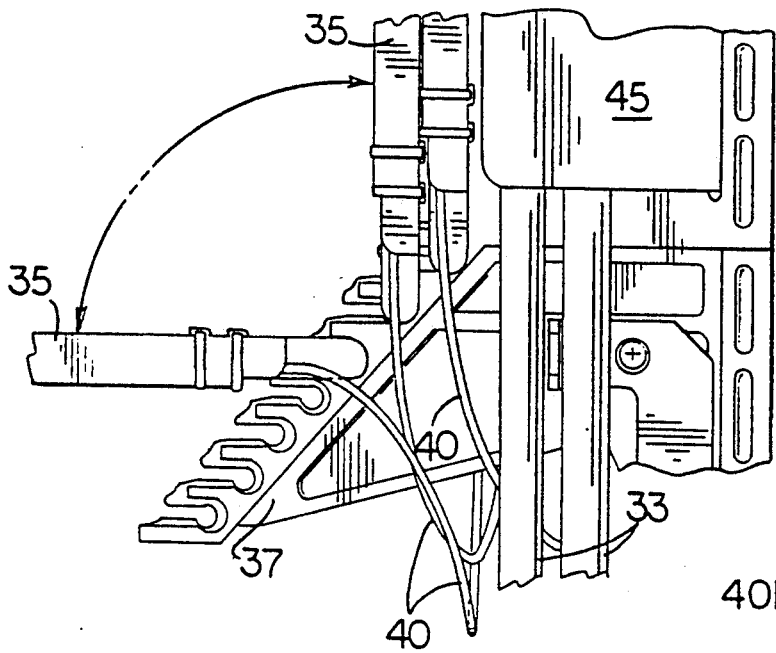
FIG. 18.
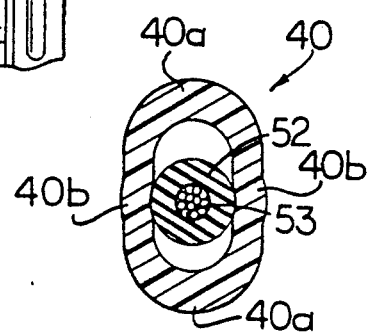
FIG. 19b.
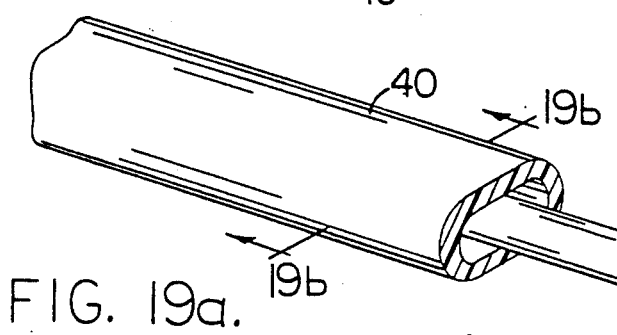
FIG. 19a.
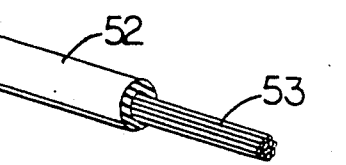
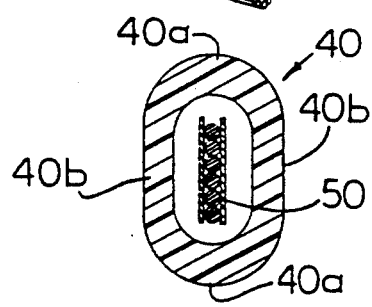
FIG. 20b.
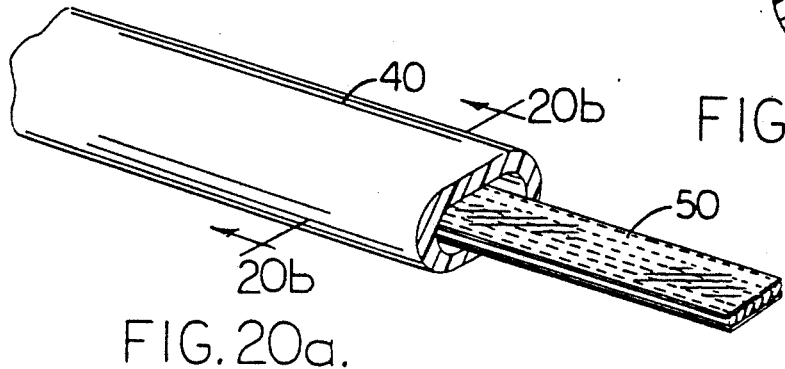
FIG. 20a.

FIBER OPTIC SPLICE CLOSURE

FIELD OF THE INVENTION

The present invention relates to the field of fiber optics and, more particularly, to a fiber optic splice closure including stacked splice organizing trays, splice holders, and transport tubes carrying optical fibers to the splice trays.

BACKGROUND OF THE INVENTION

Optical fiber communications systems, employing fiber optic cables and digital electronics, are widely used in the telecommunication industry to transmit large volumes of data and voice signals over relatively long unrepeatered distances, and virtually noise free. Splice points and drop points for the fiber optic cables are required for most such systems. At a splice point, for example, all of the fibers at one end of a cable are spliced to corresponding fibers of a tandem cable. At a drop point or express splice point, some of the fibers may be spliced to a drop cable, while most of the fibers are passed through the drop point unaltered.

For both splice points and drop points, the optical fibers are exposed from the protective cable jacket to be spliced and secured within a splice closure. The splice closure typically includes a protective housing with either a single end cap through which cables penetrate, that is, a butt-splice; or dual opposing end caps through which respective cables penetrate, that is, an in-line splice.

A typical butt-splice closure, such as the model FOSC 100 made by the assignee of the present invention, typically includes one or more splice organizers, or splice trays, disposed in stacked arrangement within the protective housing. The trays are pivotally connected at one end to a mounting bracket which, in turn, is connected to the inside face of the closure end cap. The pivotal connection permits individual splice trays to be temporarily moved to a raised position by the insertion of a removable spacer or clip near the pivot point. Accordingly, access is then available to the underlying splice tray, such as to check fiber routing or to remake a defective splice.

The cables extending into the housing are secured therein and the penetration point sealed to prevent water from entering the protective housing. Since the protective cable sheath is removed within the housing, flexible protective tubes, known as "transport tubes" are used to protect predetermined groupings of the optical fibers extending from the cable securing point to respective splice organizer trays. Such conventional transport tubes typically have a circular cross-section and a uniform wall thickness. For a typical fiber optic cable of the loose-buffer type, the predetermined groupings are typically all those fibers within a given buffer tube. In other words, a transport tube slides over an end portion of a respective buffer tube to carry and protect the fibers extending to the splice tray. One or more such transport tubes are routed to and secured to each splice tray.

The transport tubes must protect the optical fibers despite any bending that occurs, such as when the splice trays are pivoted to the raised position to access an underlying tray. Moreover, the transport tubes must prevent the optical fibers from bending more sharply than the minimum bend radius. Since individual fibers extend through the transport tubes when using a loose buffered cable, these individual fibers may readily bend along with the transport tube.

For many applications, higher fiber count cables are required. Higher fiber count cables having a relatively small cable cross-section are available and include a plurality of optical fiber ribbons, such as LIGHTPACK® fiber optic cables offered by AT&T. Optical fiber ribbons may be readily bent only in a direction normal to their major dimension equivalently to the minimum bend radius of the individual fibers. However, the ribbons may not be bent as sharply in the direction normal to their minor dimension. In other words, optical fiber ribbons preferentially bend only in the direction normal to their major dimension. Moreover, the ribbons should not be bent in the direction of their minor dimension or high signal attenuation or physical damage may result.

Unfortunately, optical fiber ribbons positioned within a conventional transport tube may be bent in any direction thereby increasing attenuation and possibly physically damaging the ribbons. In addition, a conventional transport tube also permits an optical fiber ribbon to be deformed from its flat shape and compressed or buckled when a tie wrap, for example, is used to secure the end of the transport tube to a splice organizer tray. Accordingly, a conventional circular cross-sectional transport tube is unacceptable for use in a splice closure for ribbon optical fiber cables.

Also related to the quality and longevity of optical fiber splices secured within a splice closure is a splice holder, several of which are typically mounted on a splice tray. The splice holder retains the individual splices between corresponding optical fibers. A typical splice holder may accommodate four to ten splices and must adequately secure the splices in the presence of mechanical shocks and vibration. The splices are typically protective sleeves for fusion-spliced fibers, or may be mechanical splices which position and maintain the optical fiber ends in precise alignment. For example, U.S. Pat. No. 4,679,896 to Krafcik et al. discloses a typical splice holder formed of a resilient block with a series of channels formed therein to closely resiliently receive optical fiber splices.

There is no industry standard for the precise external dimensions of an optical fiber splice; rather, there are a number of popular commercially available mechanical and fusion splices, most with different exterior dimensions. AT&T in an attempt to accommodate a number of different types of splices of different sizes, for example, offers a splice holder having a series of spaced apart deformable walls of a foam material to accommodate different sized splices. In a similar fashion, U.S. Pat. No. 4,793,681 to Barlow et al. discloses a splice holder with pairs of opposing leaf springs to accommodate different sized splices. U.S. Pat. No. 4,854,661 to Cooper et al. discloses a lid over the splice holder with a resilient pad positioned within the lid to hold the fiber splices within respective shallow grooves of the underlying splice holder. Similarly the DeSanti patent, U.S. Pat. No. 4,687,289, includes a lid which may be offset from underlying grooves to thereby accommodate a slightly smaller fusion splice, as compared to a typical mechanical splice. Despite attempts to accommodate different sized splices there still exists a need to do so while properly cushioning the splices against mechanical shock and vibration.

A splice closure also typically includes a lower slack storage tray adjacent the stacked splice trays. The slack storage tray is particularly important for a drop splice where a large number of fibers are passed through the splice closure without being spliced. A typical slack storage tray is generally rectangular in shape with perpendicularly extending opposing sidewalls. The slack storage tray extends generally lengthwise within a cylindrical housing as in the FOSC 100 splice closure. Unfortunately, such a storage tray has a limited capacity for slack storage because the height of its perpendicularly extending sidewalls is limited by the size of the cylindrical housing. As higher fiber count cables are required, especially for drop or express splice points, additional slack storage capacity is needed.

Another concern relating to splice closures includes an ability to preferentially separate a desired optical fiber or ribbon from a slack bundle on a splice organizer tray with minimum disturbance to adjacent fibers. This tedious task is typically attempted by using a relatively small hooked probe, such as a crochet needle, to separate a desired optical fiber or ribbon from slack which is positioned adjacent side walls of the splice tray.

SUMMARY OF THE INVENTION

In view of the foregoing background, it is, therefore, an object of the present invention to provide a splice closure including transport tubes that prevent undesired bending of ribbon type fiber optic cables and that may also accommodate loose buffer tube cables.

It is another object of the invention to provide a fiber optic splice closure including a series of splice trays that may be arranged in a stacked position or may be moved to a raised position to facilitate access to an underlying tray.

It is yet another object of the invention to provide a fiber optic splice closure having a series of splice holders that can readily accommodate various splices having different external dimensions.

It is still another object of the invention to provide a fiber optic splice closure including splice trays that permit the ready separation of predetermined fibers from adjacent slack fibers.

These and other objects, advantages and features of the present invention are provided by a fiber optic splice closure including a housing, a plurality of splice trays positioned within the housing and pivotally connected therein, and a plurality of generally flexible transport tubes extending from the fiber optic cable ends to the splice trays for carrying optical fibers broken out and routed to respective splice trays, wherein each of the transport tubes includes means for imparting differential flexibility between first and second directions transverse to the longitudinal axis of the transport tube. The means for imparting differential flexibility to the transport tube preferably is provided by a predetermined cross-sectional shape of the transport tube.

Preferably the cross-sectional shape of each transport tube is generally oval with a major dimension and a minor dimension to thereby impart greater flexibility for bending in the direction normal to the major dimension. Accordingly, an optical fiber ribbon positioned within the transport tube will preferably bend along its major dimension rather than its minor dimension. The transport tube also preferably has thicker opposing end wall portions than opposing side wall portions to impart the desired differential flexibility.

As would be readily understood by those skilled in the art, the transport tube preferably has a predetermined major interior dimension for receiving therein a fiber optic ribbon formed of a predetermined number of optical fibers arranged in side-by-side relation. The minor interior dimension of the transport tube is also preferably selected to frictionally engage any of a range of commercially available fiber optic loose buffer tubes. Accordingly, the transport tube may be used for both optical fiber ribbon cable and loose buffer tube cable.

The splice closure also preferably includes a bracket for pivotally mounting the splice trays. A hinge for each splice tray includes detents for holding a respective splice tray in either of two raised position to thereby facilitate access to an underlying splice tray. Access to an individual splice tray may be desired to locate or remake a defective splice.

The splice closure also includes cable termination means for securing one or more optical fiber cables within the splice closure housing. In addition, the cable termination means preferably includes guide means for guiding optical fibers from the one or more optical fiber cables along a predetermined bend radius and to the transport tubes. The guide means may accommodate either optical fiber ribbons or individual optical fibers.

The guide means preferably includes a base connected to the bracket that mounts the splice trays. An arcuately shaped wall having the predetermined bend radius extends outwardly from the base. Transport tube receiving means is provided for the guide means by a series of spaced apart walls extending outwardly from the base of the guide means and thereby defining a series of slots for securing the transport tubes.

Another aspect of the present invention is an enlarged capacity slack storage tray positioned within the splice closure housing. Conventional slack storage trays are generally rectangular in shape and thus have a limited height when positioned within a cylindrical housing. The slack storage tray according to the present invention includes a portion defined by a generally rectangular base and a pair of opposing side walls extending outwardly from the base at a predetermined obtuse angle generally following an adjacent curved portion of the cylindrical housing. Accordingly, an additional volume of slack storage space is obtained. This additional slack storage capacity is especially important for an express or drop splice point where many of the fibers are not spliced, but rather simply pass through the splice closure and must be stored as slack.

One or more fiber optic splice holders are positioned on each splice tray positioned within the splice closure. Yet another feature of the present invention is a splice holder that can accommodate a range of various manufacturers' splices that have different external dimensions. The splice holder according to the invention includes a base and a series of spaced apart flexible walls extending outwardly from the base and defining a series of channels between adjacent pairs of the walls. Moreover, each of the walls has a hollow cavity extending through a substantial portion thereof and is formed of a flexible material to thereby readily accommodate splices of different sizes within respective channels. The base and walls of the splice holder are preferably formed of integrally molded rubber.

An embodiment of the splice holder preferably includes a pair of inserts positioned in spaced apart relation and wherein each insert includes a base and a series of upstanding walls. The inserts are preferably positioned so that the walls extend through corresponding openings in a generally rigid shell which overlies the bases and provides support thereto. The shell also preferably has side walls to support the peripheral flexible walls and prevent them from bending outwardly.

Another feature of the present invention is that the bracket mounting the splice trays is generally U-shaped. Accordingly, a cable may be readily positioned passing through the U-shaped opening and to an opposite side of the splice closure. In many typical prior art splice closures, the bracket had a central opening which, therefore, required carefully threading a substantial length of cable through the central opening. The U-shaped bracket of the present invention overcomes this shortcoming of the prior art splice closures.

Still another feature of the present invention is that the splice trays include at least one pair of spaced apart ridges on an inner portion of opposing side walls of the splice tray. The ridges permit insertion of a hooked probe between the ridges to thereby facilitate separation of a predetermined optical fiber or group of optical fibers from adjacent slack optical fibers.

A method aspect according to the invention includes positioning over an optical fiber ribbon a generally flexible transport tube as described above. The transport tube has a longitudinal axis and a predetermined cross-sectional shape for imparting to the transport tube differential flexibility between first and second directions transverse to the longitudinal axis. The first direction corresponds to the direction generally normal to the major dimension of the optical fiber ribbon and has a substantially greater flexibility than the second direction which corresponds to the direction generally normal to the minor dimension of the optical fiber ribbon.

BRIEF DESCRIPTION OF THE DRAWINGS

FIG. 4 is a plan view of the slack storage tray and fiber optic guide as in the splice closure according to the invention.

FIG. 5 is a cross-sectional view of the slack storage tray of FIG. 4 taken along line 5—5.

FIG. 6 is a greatly enlarged cross-sectional view of the fiber optic guide as shown in FIG. 4 taken along line 6—6 and illustrating fiber optic transport tubes secured to a portion of the guide.

FIG. 7 is a greatly enlarged cross-sectional view of a portion of an embodiment the fiber optic transport tube according to the invention.

FIG. 8 is a perspective view of a splice holder according to the invention.

FIG. 9 is an exploded perspective view of the splice holder as shown in FIG. 8.

FIG. 10 is a bottom view of a corner portion of the splice holder as shown in FIG. 8.

FIG. 11 is a cross-sectional view of the splice holder as shown in FIG. 8 taken along line 11—11.

FIG. 12 is a cross-sectional view of the splice holder as shown in FIG. 8 taken along line 12—12.

FIG. 13 is a perspective view of a portion of the bracket and splice tray pivotally secured thereto according to the invention.

FIG. 14 is a greatly enlarged cross-sectional view taken along line 13—13 of FIG. 13 showing the splice trays in a stacked position.

FIGS. 15 and 16 are cross-sectional views similar to FIG. 14 showing the splice tray in a first and second raised position, respectively.

FIG. 17 is a greatly enlarged cross-sectional view taken along line 17—17 of FIG. 13 illustrating the connection of a transport tube to the splice tray.

FIG. 18 is a side elevational view of the hinge portion of the bracket and splice trays according to the invention illustrating the movement of a splice tray to a fully raised position, such as to facilitate removal of a splice tray.

FIG. 19a is a perspective view of the friction fit connection between the transport tube according to the invention and an optical fiber loose buffer tube.

FIG. 19b is a cross-sectional view taken along line 19b—19b of FIG. 19a.

FIG. 20a is a fragmentary perspective view of the transport tube according to the invention in which an optical fiber ribbon is positioned.

FIG. 20b is a cross-sectional view taken along line 20b—20b of FIG. 20a.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

A fiber optic splice closure according to the invention is generally designated as 30 in the accompanying drawings. The illustrated embodiment of the splice closure 30 is for a butt-splice, although, as would be readily understood by those skilled in the art, the features of the present invention may also be similarly and beneficially applied to an in-line splice.

Figure 1:
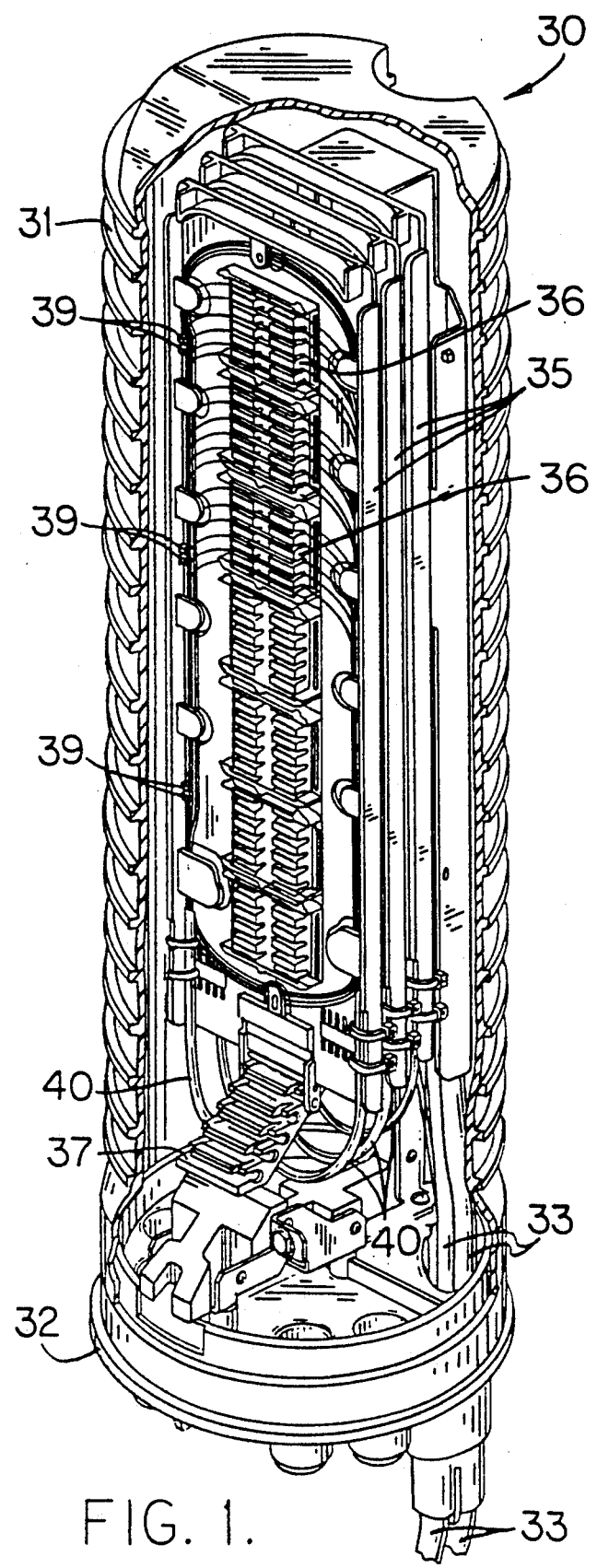
FIG. 1 is a cutaway perspective view of a splice closure according to the invention.
Figure 2:
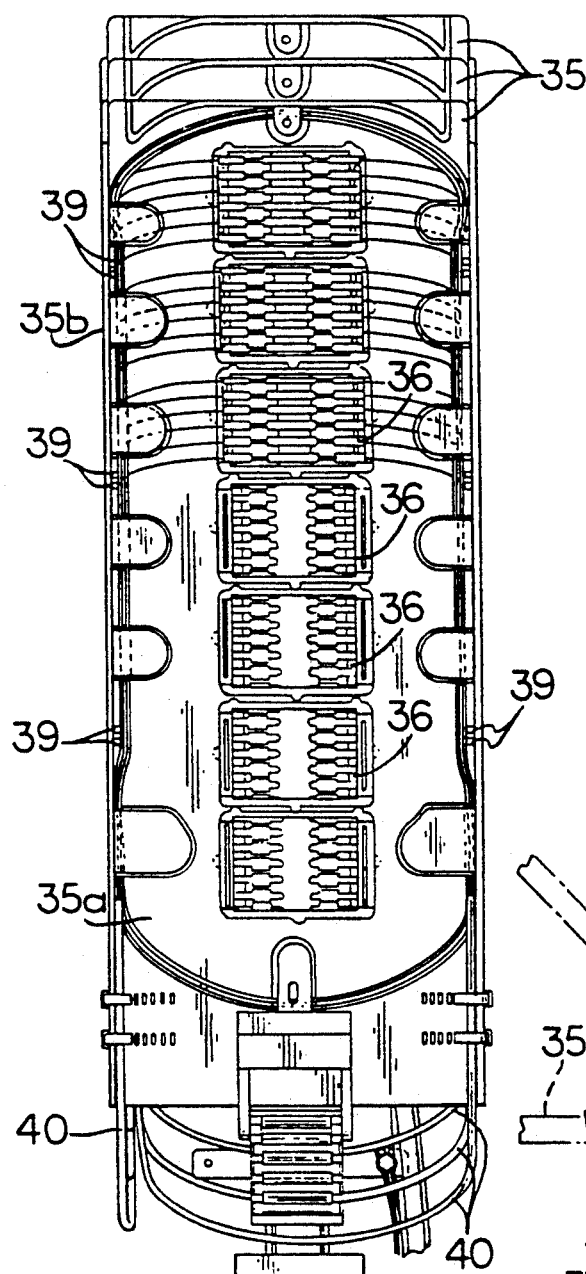
FIG. 2 is a plan view of the splice closure according to the invention with the housing and end cap removed to illustrate the series of stacked splice trays.
Figure 3:
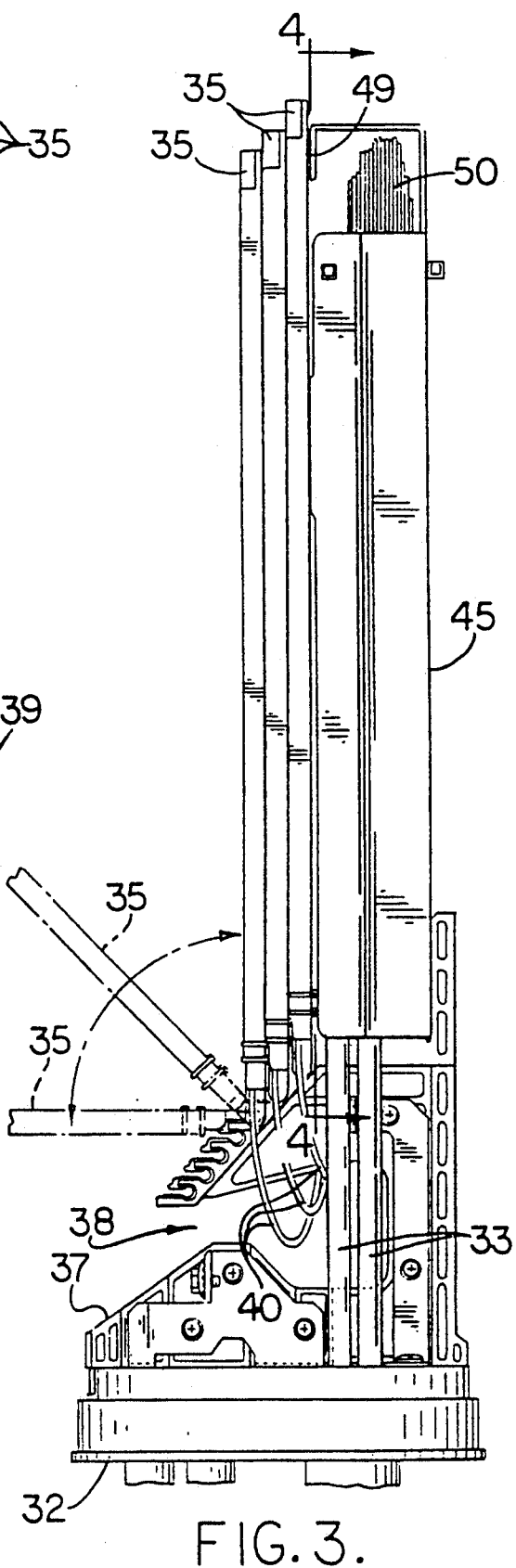
FIG. 3 is a side elevational view of the splice closure according to the invention with the housing removed to illustrate the series of stacked splice trays and the stack storage tray.

Referring now to FIGS. 1–3, several components of the splice closure 30 according to the invention will be described for general orientation. The splice closure 30 includes a generally cylindrical housing 31 with an end cap 32 secured thereto. One or more fiber optic cables 33 enter the housing 31 through suitable openings in the end cap 32. The cables 33 are secured within the splice closure 30 by cable termination means, such as including the use of conventional strain relief clamps as described below.

A series of splice trays 35 is pivotally connected at one end to a mounting bracket 37 which, in turn is connected to an inside face of the end cap 32. Each of the splice trays 35 preferably includes a series of splice holders 36 as more fully described below. The individual splice trays 35 are movable between a stacked position and a raised position to facilitate access to an underlying splice tray 35 (FIG. 3) also as more fully described below.

The optical fibers from the optical fiber cables 33 are carried by flexible transport tubes 40 to respective splice trays 35. The transport tubes 40 must be sufficiently flexible to permit the splice trays 35 to be moved between the stacked and raised positions, yet still be sufficiently rigid to prevent more sharply bending the optical fibers than the desired minimum bend radius.

The transport tube 40 according to the present invention includes means for imparting to the tube differential flexibility between first and second directions transverse to a longitudinal axis of the tube. Preferably the means for imparting the differential flexibility is a predetermined cross-sectional shape of the tube. A generally oval cross-sectional shape, as discussed in greater detail below, provides the differential flexibility. Accordingly, when the transport tube 40 according to the invention is used to carry one or more optical fiber ribbons, the ribbons are prevented from bending in a direction transverse to the minor dimension of the optical fiber ribbon, and, instead bend preferentially in a direction transverse to the major dimension of the ribbon.

Another feature of the present invention as illustrated best in the plan view of FIG. 2, is the provision of pairs of spaced apart ridges 39 extending from opposing side walls 35b of each splice tray 35. As shown in the illustrated embodiment, the splice tray 35 includes a generally rectangular base 35a and a pair of opposing side walls 35b extending outwardly therefrom. The ridges 39 on the side walls 35b permit a technician to insert a hooked probed therebetween to engage and separate out predetermined fibers from adjacent slack fibers 50.

Referring now to FIGS. 3-6, several features of the present invention are best understood. The mounting bracket 37 is generally U-shaped with a first leg secured to an inner face of the end cap 32. The generally U-shaped mounting bracket 37 provides a U-shaped or slotted opening 38 to permit a fiber cable to be routed through the opening to an opposite side of the splice closure 30. In other words, the U-shaped mounting bracket 37 according to the invention permits even a substantial length of slack cable to be routed to an opposite side of the splice closure. Thus, the U-shaped mounting bracket 37 overcomes a shortcoming of the prior art which provided a bracket having a central opening and through which the a substantial length of cable would have to carefully threaded.

The splice closure 30 also includes a slack storage tray 45 connected at one end to the U-shaped mounting bracket 37 and positioned below the series of splice trays 35. The slack storage tray 45 includes a generally rectangular base 46 and pair of opposing side walls 47 extending outwardly at an obtuse angle from the base (FIG. 5). The thus angled side walls 47 follow corresponding curved portions of the splice closure housing 31 and, therefore, provide an enlarged slack storage capacity for storing slack cable 50 within the slack storage tray 45. A upper side wall portion 48 of the slack storage tray 45 extends upwardly at a right angle to the base 45 similar to a conventional slack storage tray. The slack storage tray 45 also includes three tabs 49 extending inwardly in a plane parallel to the base 46 to thereby facilitate positioning of the slack 50 within the slack storage tray 45. As illustrated in FIGS. 4 and 5, tie wraps 51 may be used to secure the slack 50 within the slack storage tray 45.

The cable termination means of the present invention also includes guide means 55 positioned within the slack fiber storage tray 45 and to which the fiber optic cables 33 are secured (FIG. 4). the guide means 55 may accommodate optical fiber ribbon, individual optical fibers, or individual optical fibers broken out from optical fiber ribbons.

The guide means 55 includes a base 56 and an arcuately shaped wall 57 extending upwardly therefrom and having a predetermined bend radius for guiding predetermined ones of optical fibers, or optical fiber ribbons 50 as in the illustrated embodiment, to respective transport tubes 40. The guide means 55 also includes a first tab 61 extending outwardly generally parallel to the base 56 and a pair of upwardly extending tabs 62 spaced apart from the arcuately shaped wall 57 and carried in spaced apart relation therefrom by respective extended portions of the base 56 (FIG. 4).

The guide means 55 also includes transport tube retaining means 65 including a series of spaced apart walls 66 extending outwardly from the base 56 of the guide means 55. The spaced apart walls 66 may preferably have a serpentine shape to thereby define a series of notches therealong to retain respective transport tubes 40 as best illustrated by the greatly enlarged view of FIG. 6. The transport tube retaining means 65 also includes an enlarged fan-out area 67 immediately prior to the series of serpentine spaced apart walls 66 to facilitate feeding the optical fiber ribbons 50 to respective transport tubes 40.

An important feature of the present invention is that the fiber optic transport tube 40 has a differential flexibility to thereby readily protect optical fiber ribbons 50 carried within the transport tube from bending in a direction normal to their minor dimension. Such bending would likely cause the ribbon to buckle and highly stress the optical fibers. As shown in the greatly enlarged view of FIG. 7, a preferred cross-sectional shape for the transport tube 40 is generally oval or racetrack-like. As would be readily understood by those skilled in the art, other cross-sectional shapes may also be used to impart differential flexibility to the transport tube 40.

The transport tube 40 also preferably has opposing end wall portions 40a that have a predetermined thickness greater than the thickness of the opposing side wall portions 40b. Typical wall thicknesses for a polyethylene transport tube 40 are 0.037" for the end wall portions 40a and 0.032" for the side wall portions 40b. The difference in wall thicknesses is sufficient to impart the desired differential flexibility to the transport tube 40, yet sufficiently close to permit the transport tube to be readily cut using a conventional ring cutter tool, as would be appreciated by those skilled in the art. The interior major cross-sectional dimension of the transport tube 40 is preferably selected to accommodate a typical optical fiber ribbon within the major interior dimension as shown in FIGS. 20a and 20b.

The minor interior dimension of the transport tube 40 is preferably selected to frictionally engage a conventional loose buffer tube 52 with individual optical fibers 53 therein. Conventional fiber optic buffer tubes 52 are available in outside diameters of 0.095"., 0.103", and 0.120", all of which may be readily accommodated by the transport tube 40 having an minor interior dimension slightly less that 0.095". Such a minor dimension will also accommodate one or several optical fiber ribbons 50 so as to restrict the ribbons from unintended rotational movement. Thus, the ribbons are maintained within the transport tube 40 with their major dimension properly aligned with the major interior dimension of the transport tube. Accordingly, the transport tube 40 of the present invention may be advantageously used with either ribbon-type fiber optic cables or with loose tube fiber optic cables as would be readily appreciated by those skilled in the art.

Referring now to FIGS. 8-12, the features and advantages of the splice holder 36 according to the invention will now be explained. As would be readily understood by those skilled in the art, a conventional splice holder typically secures several splices in side-by-side relation. The splice holder must securely hold the splices and prevent damage thereto such as caused by mechanical shock and vibration. The splice holder 36 according to the invention accommodates a variety of different manufacturers' splices 70 with different external dimensions. In addition, the splice holder 36 protects the splices 70 from shock and vibration.

The splice holder 36 includes a generally rigid shell 71 having a predetermined pattern of openings 73 in a base portion 72 of the shell. The shell 71 also includes a pair of opposing spaced apart side walls 74. A pair of flexible inserts 77 is positioned in the shell 71 so that a series of spaced apart walls 78, extending outwardly from a base 80 of the inserts 77, passes through the corresponding openings 73 in the base portion 72 of the shell 71. The walls 78, 78a and the base 80 of the inserts 77 of the illustrated embodiment are integrally molded of a flexible rubber material. Accordingly, the generally rigid shell 71 serves to support and stabilize the flexible inserts 77 on a splice tray 35.

The flexible walls 78, 78a of the inserts 77 define a series of channels 79 for receiving therein respective optical fiber splices 70. As shown in the illustrated embodiment, the outermost walls 78a of the inserts 77 at the peripheral opposing sides of the base 80 are solid walls of about half the thickness of the interior walls 78. The side walls 74 of the shell 71 serve to prevent the outermost walls 78a from bowing outwardly an undesired amount when splices are positioned in the channels 79 adjacent the outermost walls 78a.

The flexible inserts 77 according to the invention are preferably formed of injection moldable rubber, that is, non-crosslinked, non-vulcanized rubber as would be readily known to those skilled in the art. The injection moldable rubber permits the inserts 77 to be readily injection molded and then subsequently removed from the mold despite the overhanging projections 82 on the tops of flexible walls 78, 78a. The projections 82 further serve to secure different sized splices 70 in the respective channels 79.

As shown best in the bottom view of FIG. 10 and the cross-sectional views of FIGS. 11 and 12, each of the flexible walls 78 of the inserts 77 includes a hollow cavity 84 extending through a substantial portion thereof vertically from the base 80 to near the top of the wall 78. The hollow cavity 84 permits a wider range of sizes of splices 70 to be positioned within the channels 79 and also provides enhanced cushioning and shock absorbing for the splices, especially as compared to a solid wall of a resilient material, for example.

Another aspect of the splice closure 30 according to the present invention is the provision of hinge means, including detent means, to releasably lock individual ones of the splice trays 35 in either of two raised positions as illustrated in FIGS. 13-18. Accordingly, an underlying splice tray 35 may be accessed. In prior art splice closures, such as the Raychem model FOSC 100, a freely pivotal splice tray could be propped into a raised position by a clip which was inserted adjacent the pivot point of the tray. The present invention obviates the need for this separate clip.

A hinge pin 90 is connected at one end of the splice tray 35 by a hinge pin mounting bracket 91. The splice tray mounting bracket 37 includes a series of slotted openings 93 for receiving the hinge pins 90. More particularly, the mounting bracket 37 includes a series of cammed surfaces 95 including predetermined detent portions 95a, 95b and 95c which serve together with the detent bar 96 of the splice tray to releasably lock the splice tray 35 in a stacked position (FIG. 14), a first raised position (FIG. 15), and a second raised position (FIG. 16), respectively. The detent bar 96 is secured to the hinge pin mounting bracket 91 in spaced relation from the hinge pin 90.

Another feature of the hinge means is that a splice tray 35 may be removed from the bracket 37 by aligning the tray in a full upright position (FIG. 18) which aligns opposing flat surfaces of the hinge pin 90 with the slotted opening 93 to permit the tray to be withdrawn.

FIG. 17 illustrates securing an end of a transport tube 40 to the splice tray 35. An integrally molded wedge 100 is provided in the corner between the side wall 35b and the base 35a of the tray and is secured in position with a tie wrap 101. Accordingly, the transport tube 40 is aligned at about a 45° angle in the corner so that the tie wrap 101 engages the transport tube thereby directing the compressive force of the tie wrap against the shorter and slightly thicker end walls 40a rather than the longer and slightly thinner side walls 40b of the transport tube.

As again highlighted by the pivotal motion of the splice trays 35 as illustrated in FIGS. 13-17, it is important that the transport tube 40 protect the optical fibers during any such movement. As described above, the transport tube 40 according to the present invention is particularly suited for protecting optical fiber ribbons, but may also be used for loose buffered fibers as well.

As would be readily understood by those skilled in the art in view of the above description relating to the transport tube above, a method aspect according to the present invention is for protecting an optical fiber ribbon against undesired bending in a splice closure. The method includes the step of positioning over the optical fiber ribbon a generally flexible transport tube with differential flexibility as described above. Preferably each end of the transport tube is also secured, one end to a splice tray and the opposite end to cable termination means.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fiber optic splice closure comprising:
a housing;
cable termination means connected to said housing for securing one or more fiber optic cables thereto;
a bracket connected to said housing;
a plurality of splice trays positioned within said housing, each splice tray having an end pivotally connected to said bracket and movable between a stacked position and a raised position to thereby facilitate access to an underlying splice tray; and a plurality of generally flexible transport tubes extending from said cable termination means to said splice trays for carrying optical fibers from one or more fiber optic cables to respective splice trays, each of said transport tubes having a longitudinal axis and including means for imparting to said transport tube differential flexibility between first and second directions transverse to the longitudinal axis.

2. A fiber optic splice closure according to claim 1 wherein said means for imparting differential flexibility to each of said transport tubes comprises a predetermined cross-sectional shape therefor.

3. A fiber optic splice closure according to claim 1 wherein said means for imparting differential flexibility to each of said transport tubes comprises a generally oval cross-sectional shape therefor, and wherein said generally oval cross-sectional shape has a predetermined major dimension and a predetermined minor dimension to thereby impart greater flexibility for bending in the direction generally normal to the major dimension of each transport tube.

4. A fiber optic splice closure according to claim 3 wherein said oval cross-sectional shape of each of said transport tubes has opposing end wall portions and opposing side wall portions, and wherein said opposing end wall portions have a predetermined thickness greater than a predetermined thickness of said opposing side wall portions.

5. A fiber optic splice closure according to claim 3 wherein said oval cross-sectional shape of each of said transport tubes has a predetermined major interior dimension for receiving therein a fiber optic ribbon comprising a predetermined number of optical fibers arranged in side-by-side relation.

6. A fiber optic splice closure according to claim 3 wherein said oval cross-sectional shape of each of said transport tubes has a predetermined minor interior dimension for frictionally engaging therein a fiber optic loose buffer tube having an outside diameter within a predetermined range.

7. A fiber-optic splice closure according to claim 3 wherein each of said splice trays comprises a generally rectangular base and a pair of opposing side walls extending outwardly from said base for retaining slack portions of optical fibers adjacent thereto, and further comprising a wedge positioned in a corner formed by one of said side walls and said base for receiving thereagainst a side wall portion of one of said oval shaped transport tubes.

8. A fiber optic splice closure according to claim 1 further comprising hinge means for pivotally connecting each of said splice trays to said bracket, and wherein said hinge means includes detent means for releaseably locking a respective splice tray in the raised position.

9. A fiber optic splice closure according to claim 1 wherein said cable termination means includes guide means for guiding optical fibers from one or more optical fiber cables along a predetermined bend radius and to said transport tubes.

10. A fiber optic splice closure according to claim 9 wherein said guide means includes a base connected to said bracket and an arcuately shaped wall having the predetermined bend radius and extending outwardly from said base.

11. A fiber optic splice closure according to claim 10 wherein said guide means includes transport tube receiving means comprising a series of spaced apart walls extending outwardly from said base thereby defining a series of slots receiving therein said transport tubes.

12. A fiber optic splice closure according to claim 1 wherein said housing is generally cylindrical in shape.

13. A fiber optic splice closure according to claim 12 further comprising a slack storage tray positioned within said cylindrical housing, and wherein said slack storage tray includes a generally rectangular base and a pair of opposing side walls extending outwardly from said base at a predetermined obtuse angle generally following an adjacent curved portion of said cylindrical housing to thereby provide enlarged slack storage capacity for said slack storage tray.

14. A fiber optic splice closure according to claim 1 further comprising at least one splice holder positioned on each of said splice trays for securing thereto a plurality of optical fiber splices in side-by-side relation.

15. A fiber optic splice closure according to claim 14 wherein said at least one splice holder comprises:

a base; and a series of spaced apart flexible walls extending outwardly from said base and defining a series of channels between adjacent pairs of said walls, each of said walls having a hollow cavity extending through a substantial portion thereof and being formed of a flexible material to thereby readily accommodate splices of different sizes within respective channels.

16. A fiber optic splice closure according to claim 15 wherein said base and said walls of said at least one splice holder are formed of integrally molded rubber.

17. A fiber optic splice closure according to claim 16 further comprising a rigid shell overlying said base of said at least one splice holder and having a predetermined pattern of openings therein corresponding to said series of spaced apart walls and through which said walls extend.

18. A fiber optic splice closure according to claim 1 wherein said housing includes an end cap, wherein said bracket is generally U-shaped, and wherein a leg of said U-shaped bracket is secured to said end cap thereby permitting one or more fiber optic cables to be routed through an opening of said U-shaped bracket to an opposite side of said housing.

19. A fiber optic splice closure according to claim 1 wherein each of said splice trays comprises a generally rectangular base and a pair of opposing side walls extending outwardly from said base for retaining slack portions of optical fibers adjacent thereto, and further comprising at least one pair of spaced apart ridges on an inner portion of each of said opposing side walls of said tray so as to permit insertion of a hooked probe between said ridges to thereby facilitate separation of a predetermined optical fiber or group of optical fibers from adjacent slack optical fibers.

20. A fiber optic splice closure comprising:

a housing;

cable termination means connected to said housing for securing one or more fiber optic cables thereto;

a splice tray positioned within said housing; and at least one generally flexible transport tube extending from said cable termination means to said splice tray for carrying optical fibers from one or more fiber optic cables to said splice tray, said at least one transport tube having a longitudinal axis and including means for imparting to said transport tube differential flexibility between first and second directions transverse to the longitudinal axis.

21. A fiber optic splice closure according to claim 20 wherein said means for imparting differential flexibility to said at least one transport tube comprises a predetermined cross-sectional shape therefor.

22. A fiber optic splice closure according to claim 20 wherein said means for imparting differential flexibility to said at least one transport tube comprises a generally oval cross-sectional shape therefor, and wherein said generally oval cross-sectional shape has a predetermined major dimension and a predetermined minor dimension to thereby impart greater flexibility for bending in the direction normal to the major dimension of said at least one transport tube.

23. A fiber optic splice closure according to claim 22 wherein said oval cross-sectional shape of said at least one transport tube has opposing minor dimension end wall portions and opposing major dimension side wall portions, and wherein said opposing minor dimension end wall portions have a predetermined thickness greater than a predetermined thickness of said opposing major dimension side wall portions.

24. A fiber optic splice closure according to claim 22 wherein said oval cross-sectional shape of said at least one transport tube has a predetermined major interior dimension for receiving therein a fiber optic ribbon comprising a predetermined number of optical fibers arranged in side-by-side relation.

25. A fiber optic splice closure according to claim 22 wherein said oval cross-sectional shape of said at least one transport tube has a predetermined minor interior dimension for frictionally engaging therein a fiber optic loose buffer tube having an outside diameter within a predetermined range.

26. A fiber-optic splice closure according to claim 22 wherein said splice tray comprises a generally rectangular base and a pair of opposing side walls extending outwardly from said base for retaining slack portions of optical fibers adjacent thereto, and further comprising a wedge positioned in a corner formed by one of said side walls and said base for receiving thereagainst a side wall portion of one of said oval shaped transport tubes.

27. A fiber optic splice closure according to claim 20 wherein said housing is generally cylindrical in shape.

28. A fiber optic splice closure according to claim 27 further comprising a slack storage tray positioned within said cylindrical housing, and wherein said slack storage tray comprises a generally rectangular base and a pair of opposing side walls extending outwardly from said base at a predetermined obtuse angle generally following an adjacent curved portion of said cylindrical housing to thereby provide greater slack storage capacity for said slack storage tray.

29. A fiber optic splice closure according to claim 20 further comprising at least one splice holder positioned on said splice tray for securing thereto a plurality of optical fiber splices in side-by-side relation.

30. A fiber optic splice closure according to claim 29 wherein said at least one splice holder comprises:
a base; and
a series of spaced apart flexible walls extending outwardly from said base and defining a series of channels between adjacent pairs of said walls, each of said walls having a hollow cavity extending through a substantial portion thereof and being formed of a flexible material to thereby readily accommodate splices of different sizes within respective channels.

31. A fiber optic splice closure according to claim 30 wherein said base and said walls of said at least one splice holder are formed of integrally molded rubber.

32. A fiber optic splice closure according to claim 31 further comprising a rigid shell overlying said base of said at least one splice holder and having a predetermined pattern of openings therein corresponding to said series of spaced apart walls and through which said walls extend.

33. A fiber optic splice closure according to claim 20 wherein said splice tray comprises a generally rectangular base and a pair of opposing side walls extending outwardly from said base for retaining slack portions of optical fibers, and further comprising at least one pair of spaced apart ridges on an inner portion of each of said opposing side walls of said tray to permit insertion of a hooked probe between said ridges to thereby facilitate separation of a predetermined optical fiber or group of optical fibers from adjacent slack optical fibers.

34. A fiber optic splice closure comprising: a housing;
cable termination means connected to said housing for securing one or more fiber optic cables thereto:
a splice tray positioned within said housing separately from said cable termination means; and
at least one generally flexible transport tube extending from said cable termination means to said splice tray for carrying optical fibers from one or more fiber optic cables to said splice tray;
said cable termination means including guide means for guiding optical fibers from one or more optical fiber cables along a predetermined bend radius to said at least one transport tube, said guide means including transport tube receiving means having a fiber fan-out area immediately prior thereto.

35. A fiber optic splice closure according to claim 34 wherein said guide means includes a base operatively connected to said housing and an arcuately shaped wall having the predetermined bend radius and extending outwardly from said base.

36. A fiber optic splice closure according to claim 35 wherein said transport tube receiving means comprises a series of spaced apart walls extending outwardly from said base defining a series of slots receiving therein said at least one transport tube.

37. A fiber optic splice closure according to claim 34 wherein said at least one transport tube has a longitudinal axis and has a predetermined cross-sectional shape for imparting to said transport tube differential flexibility between first and second directions transverse to the longitudinal axis.

38. A fiber optic splice closure according to claim 37 wherein the predetermined cross-sectional shape of said at least one transport tube is generally oval, and wherein said oval cross-sectional shape has a major dimension and a minor dimension to thereby impart greater flexibility for bending in the direction normal to the major dimension of said at least one transport tube.

39. A fiber optic splice closure according to claim 38 wherein said oval cross-sectional shape of said at least one transport tube has opposing end wall portions and opposing side wall portions, and wherein said opposing end wall portions have a predetermined thickness greater than a predetermined thickness of said opposing side wall portions.

40. A fiber optic splice closure according to claim 38 wherein said oval cross-sectional shape of said at least one transport tube has a predetermined major interior dimension for receiving therein a fiber optic ribbon comprising a predetermined number of optical fibers arranged in side-by-side relation.

41. A fiber optic splice closure according to claim 38 wherein said oval cross-sectional shape of said at least one transport tube has a predetermined minor interior dimension for frictionally engaging therein a fiber optic loose buffer tube having an outside diameter within a predetermined range.

42. A fiber optic splice closure according to claim 34 further comprising at least one splice holder positioned on said splice tray for securing thereto a plurality of optical fiber splices in side-by-side relation.

43. A fiber optic splice closure according to claim 42 wherein said at least one splice holder comprises:
 a base; and
 a series of spaced apart flexible walls extending outwardly from said base and defining a series of channels between adjacent pairs of said walls, each of said walls having a hollow cavity extending through a substantial portion thereof and being formed of a flexible material to thereby readily accommodate splices of different sizes within respective channels.

44. A fiber optic splice closure according to claim 43 wherein said base and said walls of said at least one splice holder are formed of integrally molded rubber.

45. A fiber optic splice closure according to claim 43 further comprising a rigid shell overlying said base of said at least one splice holder and having a predetermined pattern of openings therein corresponding to said series of spaced apart walls and through which said walls extend.

46. A fiber optic splice holder comprising: a base;
 a series of spaced apart flexible walls extending outwardly from said base and defining a series of channels between adjacent pairs of said walls, each of said walls having a hollow cavity extending through a substantial portion thereof and being formed on a flexible material to thereby readily accommodate splices of different sizes within respective channels, and
 a rigid shell overlying said base and having a predetermined pattern of openings therein corresponding to said series of spaced apart walls and through which said walls extend.

47. A fiber optic splice holder according to claim 46 wherein said base and said walls are formed of integrally molded rubber.

48. A fiber optic splice holder according to claim 46 further comprising a pair of opposing solid flexible side walls extending outwardly from said base at peripheral opposing sides of said series of spaced apart walls.

49. A fiber optic splice holder according to claim 48 wherein said shell further comprises a pair of opposing generally rigid side walls adjacent an outer portion of said pair of opposing solid flexible side walls so as to substantially prevent outward flexing thereof.

50. A fiber optic splice holder comprising:
 a pair of inserts arranged in spaced apart relation, each insert comprising a flexible base, and a series of spaced apart flexible walls extending outwardly from said base and integrally molded therewith, said series of spaced apart walls defining a series of channels between adjacent pairs of said walls, each of said walls being formed of a flexible material to thereby readily accommodate splices of different sizes within respective channels; and
 a rigid shell overlying both of said bases of said pair of inserts and having a predetermined pattern of openings therein corresponding to said series of spaced apart walls and through which said walls extend.

51. A fiber optic splice holder according to claim 50 wherein each of said walls of said pair of inserts has a hollow cavity extending through a substantial portion thereof.

52. A fiber optic splice holder according to claim 50 wherein each of said inserts further comprises a pair of opposing solid flexible side walls extending outwardly from said flexible base at peripheral opposing sides of said series of spaced apart walls, and wherein said pair of side walls is integrally molded with said flexible base.

53. A fiber optic splice holder according to claim 52 wherein said shell further comprises a pair of opposing generally rigid side walls adjacent an outer portion of said pair of opposing solid flexible side walls of said pair of inserts so as to substantially prevent outward flexing thereof.

* * * * *